May 19, 1959 L. A. D'AMELIO 2,886,872
LOCK FASTENERS
Filed March 1, 1954
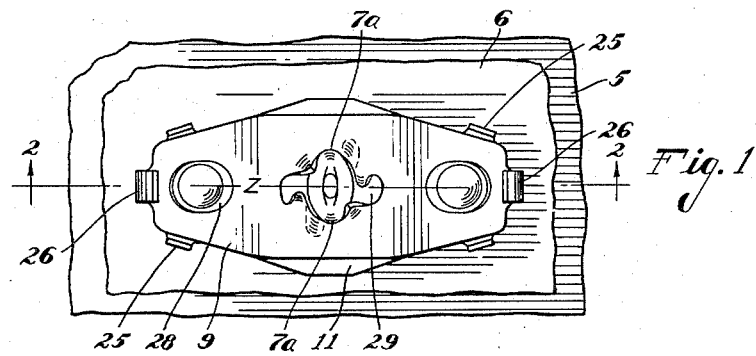
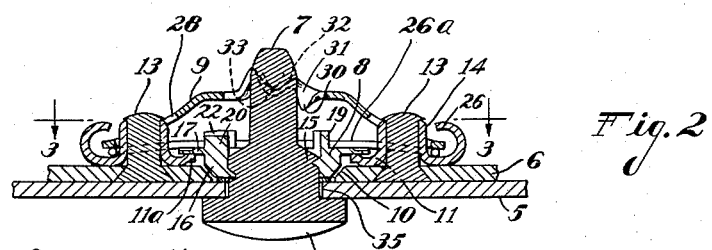
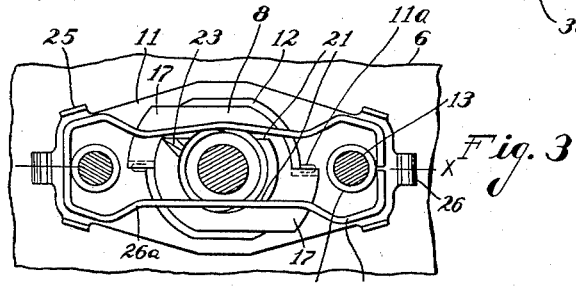
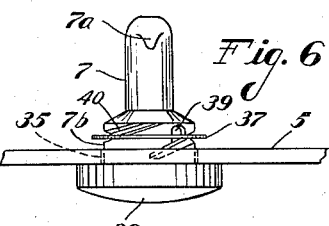
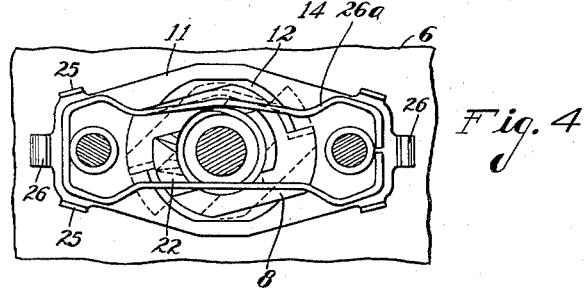
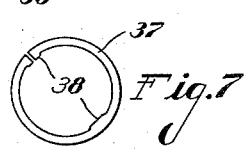
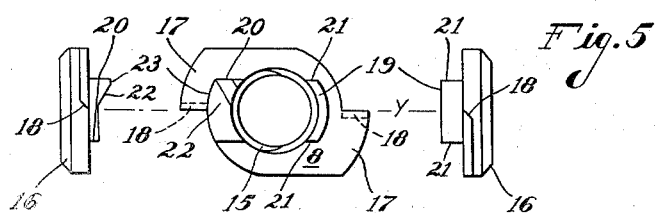
INVENTOR.
LOUIS A. D'AMELIO
BY
D. Clyde Jones
ATTORNEY

United States Patent Office 2,886,872
Patented May 19, 1959

2,886,872

LOCK FASTENERS

Louis A. D'Amelio, East Meadow, N.Y., assignor, by mesne assignments, to Lion Fastener Company, Inc., Chester, Pa., a corporation of Delaware Application March 1, 1954, Serial No. 413,191

2 Claims. (Cl. 24—221)

This invention relates to an improved lock fastener which is easily fastened and released, merely by a fractional turn of its locking element.

One of the major problems confronting manufacturers generally and aircraft manufacturers in particular, is the "buttoning up" or quickly fastening together of sheets, that, on occasion, need to be quickly separated. At the extremely high speeds at which aircraft are now flown, lock fasteners of the conventional type tear out of the sheets unless these sheets are heavily reinforced in the region of the fasteners.

In prior fasteners of this type the locking studs thereof have been maintained in their locking positions solely by spring actuated latches so that the strength of the fasteners against shearing action has been limited by the strength of the springs. As the requirements against shearing failure arising from stud fasteners have increased particularly for use on high speed airplanes, such conventional spring type fasteners have fallen far short of reliable fastening action.

In accordance with the present invention there is provided a lock fastener in which a fractional turn stud threadedly engages a nut to withstand the extreme shearing forces encountered in service while a spring actuated latch cooperates with the stud to maintain it in its fastening and releasing positions without being subjected to the mentioned forces.

Conventional lock fasteners, when under load, permit some undesirable separation between the fastened inner and outer sheets. However, the lock fastener of the present invention, with the solid threaded engagement between the nut and stud thereof, insures no sheet separation up to the limit of a destructive load.

Furthermore, conventional lock fasteners become damaged when they are subjected to overtorquing, whereas the present fastener cannot be overtorqued unless the threads on the interengaging parts are stripped or unless the fastener is destroyed by a shear load applied thereto.

The various other features and advantages of the invention will appear from the detailed description and appended claims when taken with the drawings in which:

Fig. 1 is a top view showing the lock fastener in position to lock the inner and outer sheets in their fastened position;

Fig. 2 is a sectional view taken substantially on the line 2—2 of Fig. 1 showing the fastener in locking position;

Fig. 3 is a horizontal section view taken substantially on the line 3—3 of Fig. 2 showing the nut and its related parts in its neutral or unlatched position;

Fig. 4 is a sectional view similar to Fig. 3 showing in full lines the position of the locking nut when fastening inner and outer sheets of the maximum thickness which can be used with this size of fastener, and in dotted lines showing the position of the nut and related parts when fastening inner and outer sheets of minimum material thickness to be used with the present size of fastener;

Fig. 5 shows a top view of the nut and at the left thereof illustrates the left hand edge thereof while at the right of this nut there is shown a right hand edge view thereof;

Fig. 6 illustrates an outer sheet with the stud mounted therein; and

Fig. 7 illustrates a grommet for retaining the stud in captive relation to the outer sheet.

In the drawings, the numeral 5 designates an outer sheet such as a cowl sheet to be fastened in place, and the numeral 6 designates a fixed supporting inner sheet or other part to which the outer sheet is to be detachably fastened by the lock fastener of the present invention. The fastener proper comprises a multiple threaded rotatable stud element 7 carried on sheet 5, together with a locking nut 8 carried on sheet 6 and multiple threaded internally to cooperate with the threaded stud while the parts are in fastening position, and also comprises a resilient latch 9. The function of the multiple threaded stud and its cooperating multiple threaded nut is similar in principle to that of a nut and bolt except that in the present instance the depth and pitch of the multiple threads are much greater than that of conventional bolts and nuts. The latch 9 is also carried on sheet 6 and engages one end portion of the stud element 7, such as the lugs 7a of said end portion, to latch the stud in locking position when the stud has been given a fractional turn, for example a quarter turn in one direction, and to unlatch the stud element when it is given a like fractional turn in the reverse direction.

The inner sheet 6 has a circular opening 10 therein countersunk so that the side wall of the opening is beveled toward the lower surface of this sheet (Fig. 2). The upper surface of sheet 6 has securely attached thereagainst, an elongated base strip 11 with a central opening 12 (Fig. 3) therein in superimposed relation to opening 10. In order to effect this attachment, the base strip 11 at its principal axis X (Fig. 3), is preferably provided with sleeve-like portions 14 (Fig. 2) adjacent its opposite ends. Upstanding rivets 13 pass through countersunk openings in sheet 6 and through said sleeve-like portions 14; and the exposed inner ends of the rivets are upset to fasten the base strip 11 securely to the sheet 6. The central opening 12 in base strip 11 is symmetrically located with respect to axis X (Fig. 3) of the base strip, said central opening being much larger than opening 10 (Fig. 2) and in registry therewith. The base strip, on its exposed surface, has embossings 11a (Figs. 2 and 3) located at the axis X at the opposite sides of opening 12, for a purpose to be described.

The locking nut 8 (Fig. 5) which is supported on the base strip as will be pointed out, is provided internally with two high pitched grooves or multithread leads 15 (Figs. 2 and 5). The lower part of the nut is provided with a downwardly projecting substantially circular portion 16 with a frusto-conical or chamfered edge to extend through the opening 12 in the strip 11 and adapted in one of its operating positions to have its chamfered edge descend into opening 10 of sheet 6 to snugly mate with the chamfered wall thereof. The nut is formed with arms 17 located at opposite sides of an axis Y (Fig. 5) thereof and extending in opposite directions beyond the edges of the nut proper. These arms, except in their neutral position, ride primarily on the bosses 11a on the base strip. It will be noted that the edges 18, 18 of these arms are chamfered so that they will ride up on the mentioned bosses 11a and thereby reduce friction between the nut and the sheet 6 when the nut tends to move counter-clockwise from its neutral position shown in Fig. 3. The top of the nut is formed with two arcuate ribs 19 and 20 extending generally at right angles to the axis Y. Rib 19 has a flat bearing surface defining a shoulder 21 at each of its ends. The rib 20, however, has an inclined or cam surface 22 leading to a shoulder 23 of approximately the same height as each shoulder 21.

The base strip 11 has a pair of symmetrically located, upstanding lateral lugs 25 near each end thereof and an integral ear 26 at each end thereof. The lugs 25 confine and limit the lateral movement of a floating torque retaining spring 26a which engages the nut 8, which spring is held to limited lengthwise movement by ears 26. This spring is preferably made of a length of piano wire bent to the outline shown in Fig. 3 to engage at least one of the upstanding shoulders 21 of the head of the nut 8 and tending to hold it against unlimited rotation in the manner of a wrench, as will be described. The ears 26 are bent inward as shown in Fig. 2 to limit the outward movement, with respect to the base strip 11, of floating latch spring 9 which functions to engage the lugs 7a of the stud 7 to releasably hold the stud in locking position.

While any resilient latch means can be used in the fastener of this invention, it is convenient to use an outwardly bowed resilient sheet metal spring 9 with a hole 28 in each end thereof, each hole being located on the principal axis Z of the spring and being elongated in the direction of that axis. Thus the spring 9 can be mounted for limited floating movement on the sleeve-like portions 14 of the strip 11, to rest on the respective ends of the torque spring 26a, the movement of the spring 9 away from base strip 11 being limited by the ears 26. The intermediate portion of the spring 9 is provided with an elongated stud-receiving opening 29 symmetrically positioned along the principal axis Z of the spring and in alignment with the opening in the nut 8 and also with the opening 12 in the base strip. The margin of the spring at each side of the axis Z and defining the elongated opening 29 therein, is formed into cooperating right hand and left hand latching portions. Each latching portion is formed into an inturned cam lip 30 (Fig. 2) merging into an upwardly extending cam surface 31. This surface extends over a cam rise 32 into a radially extending groove 33. The two grooves 33 in the right and left hand cooperating members, receive and hold the integral oppositely extending lugs 7a on the stud element 7, when the fastener is in locking position.

The stud element 7 is preferably mounted in an opening 35 in sheet 5 which opening is adapted to register with the opening 10 in sheet 6. The head 36 of stud element 7 which engages the outer surface of sheet 5, can be of the screw head, wing head or knurled head type whereby the stud can be rotated to its respective locking and releasing positions. In order to retain the stud in captive relation on the sheet 5, a split circular grommet 37 of sheet material (Fig. 7), is provided. This grommet is made with opposed ears 38 to snap into the opposed notches 39 (Fig. 6) in the stud shank after the stud has been inserted through the opening 35 in sheet 5. It should be understood that the grommet can be readily disengaged from the stud by means of a pointed instrument which can open the grommet ring and pry the opposed ears from the opposed notches 39. The portion 7b of the stud shank adjacent the head 36 is enlarged, the enlargement extending well into nut 8 when the fastener is locked. This portion 7b of the stud shank, beginning at a point thereon near where it emerges from the sheet 5, is also provided at each of its opposite sides with a high pitch spiral groove or thread 40 (Fig. 6) mating with the corresponding high pitch internal threads 15 on nut 8. The remainder of the stud shank extending from the enlargement 7b to its free end is of reduced diameter.

In the operation of the fastener the outer sheet 5 is placed in superimposed relation to inner sheet 6 and with the reduced portion of the stud 7 inserted through the opening in the inner sheet as well as through the hole in nut 8. The stud is then given a quarter turn in a clockwise direction (Fig. 3) so that the threads on the stud engage the threads in the nut. During eighty degrees of this turn the sheets 5 and 6 are brought firmly together, while the remaining ten degrees of the quarter turn take up or compensate for buckled sheets or other deformation of the structures to be brought together by the stud and nut. The nut, since it is provided with a chamfered edge and since it is floatingly engaged by the torque spring 26a, tends to overcome some misalinement in the openings in the two sheets. During the turn of the stud, the nut tends to draw the sheets into proper alinement. In addition to overcoming misalinement of the sheets, the chamfered surface of the nut by bearing on the wall of the tapered opening in the inner sheet, distributes the shear load equally in the area of the inner sheet around the opening 10 therein. The torque spring 26a tends to apply a counter-clockwise force and a tension force to tighten the nut 8 in the event of excessive vibration of the several parts. In the locking motion where inner and outer sheets of maximum or minimum thickness are used, the nut 8 tends to slip counter-clockwise so that the torque spring tends to slide on the cam rise 22 (Fig. 5) of the nut so that the downward tensioned force of the torque spring tends to slip the nut around into its normal position. The spring 26a pressing on the inclined surface 22 of the nut 8 tends to rotate the nut reversely. Actual tests have proved that the shear strength of the lock fastener of the present invention, is substantially double that of conventional lock fasteners.

It will be understood that there can be numerous modifications and variations in the present invention except as limited by the appended claims, without departing from the spirit of the present invention.

What is claimed is:

1. Means for releasably securing an outer sheet and an inner sheet together with their adjacent surfaces in intimate contact, said sheets having registering circular openings therein, the opening in the inner sheet being defined by a side wall which is tapered toward the outer sheet and which is larger than the opening in the outer sheet, said means comprising a stud having a head adapted to engage against said first sheet and having a stud shank substantially filling the opening in the outer sheet and adapted to have a free end catch portion projecting through the opening in the inner sheet, a grommet engaging said stud at the inner surface of the outer sheet remote from the stud head whereby said stud is held in captive relation to said outer sheet, a nut having peripherally a tapered portion to engage and mate with the tapered wall of the larger opening, external multiple threaded sections on said stud shank, interengaging internal multiple threaded sections in the bore of said nut, said sections being adapted to be brought into engaging relation by a fractional rotation of said stud, an elongated base strip having an enlarged central opening therein, said base strip being mounted on the inner surface of the inner sheet with the central opening in superimposed relation to the opening in said inner sheet, a torque spring floatingly holding said nut against substantial rotation thereof, means on said base strip confining the torque spring against rotational movement, an outwardly bowed, resilient latch member having an opening registering with the aforesaid openings through which the catch portion of said stud projects, means on said base strip restraining movement of said latch member with respect to said base strip, and latching means on an intermediate portion of the latch member engaging the catch portion on the stud shank for releasably locking said stud and said nut in interengagement.

2. Means for releasably securing an outer and an inner sheet together, comprising a headed stud having enlarged and reduced shank portions adapted to be passed through registering openings in the two sheets, said stud having its shank portions projecting inwardly beyond said inner sheet, said enlarged shank portion having a threaded portion which has a plurality of separate thread sections of separate leads, respectively, and said reduced shank portion having adjacent its inner end a plurality of laterally projecting lugs, a nut adapted to have threaded engagement with the threaded portion of said stud, said nut being provided with a plurality of internal thread sections of separate leads, respectively, adapted to interengage with the thread sections of said stud by a fractional turn of said stud in one direction, means for resiliently holding said nut against substantial rotation, a resilient latch strap having a hole therethrough through which the inner end of said stud extends, and means for holding said latch strap at its ends for limited movement with respect to said sheets, said latch strap having cam portions around said hole with which said lugs engage to releasably lock said stud and nut in engagement upon said fractional turn of said stud in said one direction.

References Cited in the file of this patent

UNITED STATES PATENTS

| | | |
|---|---|---|
| 896,709 | Bryce | Aug. 25, 1908 |
| 2,204,829 | Shippee | June 18, 1940 |
| 2,350,255 | Shippee | May 30, 1944 |
| 2,358,005 | Green | Sept. 12, 1944 |
| 2,364,906 | Lumsden | Dec. 12, 1944 |
| 2,380,240 | Hufferd | July 10, 1945 |
| 2,439,975 | Jones | Apr. 20, 1948 |
| 2,477,178 | Hallock | July 26, 1949 |
| 2,487,330 | Green | Nov. 8, 1949 |
| 2,662,260 | Marschner | Dec. 15, 1953 |

FOREIGN PATENTS

| | | |
|---|---|---|
| 9,818 | Great Britain | 1891 |
| 372,731 | France | Apr. 17, 1907 |
| 722,839 | France | Jan. 5, 1932 |